United States Patent [19]
Dorr

[11] Patent Number: 5,477,330
[45] Date of Patent: Dec. 19, 1995

[54] SYNCHRONIZATION TO A START-OF-SCAN DETECTION, AND DIGITAL GENERATION OF VARIABLE FREQUENCIES, FROM A FIXED-FREQUENCY FIXED-PHASE FREQUENCY SOURCE IN AN IMAGE GENERATOR IN ORDER TO HIGHLY ACCURATELY TIME THE PLACEMENT OF PIXELS UPON A SCAN LINE

[75] Inventor: Stanley A. Dorr, Eden Prairie, Minn.

[73] Assignee: Printware, Inc., St. Paul, Minn.

[21] Appl. No.: 962,302

[22] Filed: Oct. 16, 1992

[51] Int. Cl.$^6$ ................................................ H04N 1/21
[52] U.S. Cl. .................... 358/296; 358/409; 358/410; 347/235; 347/249; 347/250
[58] Field of Search .................... 358/409, 410, 358/474, 481, 296, 298; 346/108, 160, 109; 347/235, 248, 249, 250

[56] References Cited

U.S. PATENT DOCUMENTS

| | | | |
|---|---|---|---|
| 4,482,902 | 11/1984 | Bailey et al. | 346/108 |
| 4,667,292 | 6/1987 | Shimada | 358/410 X |
| 4,692,877 | 9/1987 | Byerly et al. | 358/474 |
| 4,796,095 | 1/1989 | Shimada | 358/410 |
| 4,872,065 | 10/1989 | Isono et al. | 358/409 |
| 5,014,137 | 5/1991 | Shimada | 358/410 |
| 5,117,243 | 5/1992 | Swanberg et al. | 346/108 |

*Primary Examiner*—Peter S. Wong
*Assistant Examiner*—Randy W. Gibson
*Attorney, Agent, or Firm*—William C. Fuess

[57] ABSTRACT

A highly accurate and stable, but continuous fixed-phase fixed-frequency, quartz crystal oscillator frequency source, typically of 80 Mhz frequency, is used as the primary frequency standard for (i) synchronized, and (ii) variable, pixel placement timing in a bee-scanning image generator. A fixed-frequency timing chain appropriately synchronized to the scanning energy beam is generated by selecting, in accordance with a sensed start-of-scan condition, from among a number, typically 23, of variably-phase-delayed, typically by less than 1 nanosecond and normally by 0.8 nanosecond, replications of a fixed-phase timing chain that is produced from the crystal oscillator. The synchronized fixed-frequency timing chain so derived is then converted to the required variable-frequency pixel placement timing chain by timing-data-driven recombination of variably-phase-delayed replications, typically 13 such replications at a delay of 1.5 nanoseconds one to the next, of each of (i) the source, fixed-frequency, timing chain and (ii) a 180° phase-shifted version of this source timing chain. The (i) synchronized and (ii) variable-frequency pixel placement timing chain so derived from a fixed-phase fixed-frequency source is both stable and accurate for sub-millimeter precision positioning of typically 32,400+ pixels along scan lines of 45+ centimeters (i.e., 1800 pixels/inch) generated at a typical rate of 540 Hz in, and by, a self-resonant scanning galvanometer laser imager.

9 Claims, 14 Drawing Sheets

SYNCHRONIZATION TO A START-OF-SCAN DETECTION, AND DIGITAL GENERATION OF VARIABLE FREQUENCIES, FROM A FIXED-FREQUENCY FIXED-PHASE FREQUENCY SOURCE IN AN IMAGE GENERATOR IN ORDER TO HIGHLY ACCURATELY TIME THE PLACEMENT OF PIXELS UPON A SCAN LINE

BACKGROUND OF THE INVENTION

1. Field of the Invention

The present invention generally concerns image generators where an energy beam is selectively turned on and off at clocked intervals while it is scanned across a markable media in order that it may selectively mark the media.

The present invention more specifically concerns image generators where, because the energy beam is scanned across the media at a non-uniform velocity, the clocked intervals are nonuniformly separated, and the clocking waveform is of a variable frequency.

The present invention still more specifically concerns (i) the phase synchronization of a fixed-phase clock to an asynchronous, sensed, occurrence of a start-of-scan line condition, and (ii) the digital generation of a variable-frequency clock waveform from a fixed-frequency clock.

2. Description of the Prior Art

In a beam-scanning imaging device, such as a laser printer, an energy beam, normally a laser light beam such as is derived from a helium-neon laser or a laser diode, is swept across a photoconductive target such as a photoconductive drum or photoconductive paper, or a photosensitive target, such as photographic film or plates. Diverse ways of scanning the light beam exist. These include motor-driven polygonal mirrors, spinning holographic disks, a linear galvanometer and mirror, or a self-resonating galvanometer scanner. A survey of these methods is contained in the article "Laser Scanning and Recording: Developments and Trends" occurring in LASER FOCUS/ELECTRO-OPTICS for February 1895 at pages 88–96.

The motion of the marker, or laser, energy beam across the markable media is typically not linear. In a self-resonating galvanometer scanner imaging system, in particular, the motion of the scanning mirror, and the swept energy beam, is periodic and sinusoidal. The swept energy, or laser, beam typically traverses the media at a maximum scan velocity at or near the center of each imaged line, and the center line of the imaged area. Conversely, the minimum scan velocity is at or near the ends of each imaged line, and the side borders of the imaged area.

Because of the variable velocity of the scanning energy beam across the imaged media, the imaged pixels must placed upon the media at differing time intervals, one to the next. This requires a variable-frequency clock.

The placement of pixels on the media is responsive to timing signals, or a timing chain, that is, consequent to the non-regular times and non-uniform durations at which pixels are placed, of a varying frequency. A common prior art means of deriving such a variable-frequency pixel placement timing chain was a voltage controlled oscillator (VCO). AVCO has the advantages that it may be both (i) started and stopped, producing thereby a controllable beginning and end to the oscillations, or timing chain, that is generated, and (ii) adjusted, or cycled, in frequency during oscillation by a variation in its input d.c. voltage.

Although a VCO may be straightforwardly adapted to produce a variable-frequency pixel placement timing chain, it suffers form problems of stability and repeatability. Nonetheless that a pixel placement timing chain should of a variable frequency, it is desired to be both (i) highly accurate and (ii) highly repeatable during a single scan line, and from one scan line to the next. If the pixel placement timing chain is not accurate the individual pixels will not be placed in the precisely correct locations along the scan line, and/or will be of irregular and non-uniform size. if the pixel placement timing chain is not repeatable then the pixels upon one line will be at different locations than the corresponding pixels that are upon preceding, or succeeding, lines, causing a visually detectable flaw in the image. These problems are generally most severe in the region of the image that is the last to be produced, which is generally at its right side. These problems are generally more severe if the image is large, slowly generated, and/or contains many pixels per inch—permitting a greater accumulation of error before the commencement of a new line scan imaging cycle.

In a related area, it is known in a swept-beam imager, such as in an imager deflecting a laser beam by use of a self-resonant galvanometer scanner, to use a photo diode to detect the start of each scan line. One use of such a photodiode is taught in U.S. Pat. No. 4,686,363 to Schoon for a SELF-RISONANT SCANNER BIASING SYSTEM. The start-of-scan photo diode produces an synchronous signal to which the variable-frequency pixel placement timing chain must normally be synchronized in order to accurately produce an image.

SUMMARY OF THE INVENTION

The present invention contemplates the use of a highly accurate and stable, but continuous fixed-frequency, quartz crystal oscillator frequency source as the primary frequency standard for pixel placement timing in a beam-scanning image generator that requires and desires both (i) synchronization of a pixel placement timing chain to the scanning energy beam that marks the media, and (ii) a variable-frequency pixel placement timing chain.

1. of the Pixel Placement Timing Chain

In accordance with a first separate and severable aspect of the present invention, a stable and accurate continuous fixed-frequency clock, which clock is of random phase relative to a scanning energy beam that marks the media within an imaging device, is used to produce a correspondingly stable and accurate pixel placement timing chain that is synchronized to a scanning energy beam.

The fixed-frequency clock is, for example, a quartz crystal oscillator frequency source, preferably of a high frequency and most typically of 80 Mhz frequency, that exhibits insignificant drift both during the placement of a great number of pixels upon a scan line, typically 32,400 such pixels along a scan line of 18 inches length (i.e., 1800 pixels/inch), and also during the time intervals between successive scan lines, which scan lines are typically generated at a 540 Hz rate. Because the quartz crystal oscillator fixed-frequency clock is continuously running, and fixed in phase, it is of a random phase relative to the scanning energy beam that marks the media within the imaging device.

Accordingly, the fixed-frequency clock must be, and, in accordance with the present invention it is, delayed a variable amount of time in order to produce a chain of pixel placement timing signals that are synchronized with the scanning energy beam. This synchronization preferably occurs upon each sweep of the scanning energy beam, and more preferably at the beginning of each such sweep, and still more preferably at a precisely fixed time interval after a sensor detects of a start-of-scan condition of the scanning energy beam.

In its preferred embodiment, the pixel placement timing Chain synchronization method in accordance with the present invention—which method is performed in a scanning-energy-beam image generator in order to synchronize a pixel placement timing chain to the position of the scanning energy beam—commences with the generation of a fixed-frequency timing chain by a fixed-frequency clock oscillator. This fixed-frequency timing chain is then replicated in a delay line the fixed-frequency timing chain to produce a plurality of variably-phase-delayed timing chain. A sensor detects, and at a time asynchronous to the fixed-frequency timing chain, a set position of the scanning energy beam (normally the start-of-scan position). A comparison circuit compares the asynchronous detection of the set position of the scanning energy beam to each of the plurality of variably-phase-delayed timing chains in order to identify a one such variably-phase-delayed timing chains that is in a predetermined, fixed, time relationship to the detection. The identified one of the variably-phase-delayed (but fixed-frequency) timing chains is subsequently used in the image generator to produce another, variable-frequency, timing chain that is suitable to control the regular placement of pixels upon a scan line by the scanning energy beam.

In detail operation, a delay line receives a chain of timing signals from an oscillator, typically a quartz crystal oscillator of frequency from 75 to 100 Mhz and more typically of frequency 80 Mhz, and produces therefrom a number, typically 24, of phase-delayed chains of timing signals. The phase delay from the corresponding signals of one phase-delayed timing chain to the next is typically 0.56 to 0.8 nanoseconds.

An equal number (typically 24) of first, phase, detectors, each respectively receives (i) an associated one of the phase-delayed chains of timing signals and also, asynchronously, (ii) a start-of-scan signal developed by the traverse of a scanning energy beam so far in a first direction of its excursion so as to impinge upon a first, start-of-scan, fixed point. Each of the first detectors produces a first signal that is true only when the asynchronous receipt of the start-of-scan signal occurs before a first one of the timing signals of the associated received one of the phase-delayed timing chains.

Next, an equal number minus one (ergo, typically 23) of second, "next stage", detectors each respectively receives both (i) the first signal from an associated one of the first detectors, and also (ii) the first signal of a next successive one of the first detectors to said associated one. Accordingly, the second detectors are not just upon a "next" stage to the first detectors, but receive a signal from a "next" successive one, or "stage", of the several first detectors. Each second detector produces a second signal that is true when, of both first signals received, only that first signal that originates from said next successive one of the first detectors is true. Effectively, only the one second detector for which the corresponding first detector has not yet detected the asynchronous start-of-scan pulse to be coincident with the lead pulse of the timing chain, but for which the first detector of the next stage does so detect the asynchronous start-of-scan coincident with the lead pulse of the timing chain, will be satisfied, and will produce the second signal.

Finally, a gating circuit is responsive to the second signal produced by a one of the plurality of second detector means to selectively gate the appropriately associated phase-delayed timing chain. Namely, the gated phase-delayed timing chain is that which was received at that associated one the first detectors to that one of the second detectors that produced the true second signal. This phase-delayed, and selectively gated, chain of timing signals is synchronized with the sensed occurrence of the start-of-scan.

2. Digital Generation of a Variable-Frequency Pixel Placement Timing Chain from a Fixed-Frequency Timing Chain In accordance with a second separate and severable aspect of the present invention, a variable-frequency pixel placement timing chain is digitally generated from a fixed-frequency timing chain. in an imaging apparatus.

The variable-frequency timing chain is necessary because the imaging apparatus scans an energy beam across a markable media at a scan velocity that is not constant. A marker is responsive to clocked information for turning the scanning energy beam on and off during the course of its scan across the markable media in order that it may selectively mark the media. In this situation a variable-frequency timing chain must clock information to the marker means at non-uniformly-temporally-separated instances during the non-constant-velocity scan of the beam. It is only by such variable-frequency timing that the marker will, nonetheless that the beam is scanned at the non-constant velocity, successfully selectively mark the media at regular intervals.

In accordance with the present invention the variable-frequency clock is derived from ( i ) a fixed-frequency clock oscillator that produces a fixed-frequency timing chain by (ii) a conversion circuit that converts the fixed-frequency timing chain into a variable-frequency timing chain. The basic, rudimentary, method of so doing starts with the generation of the fixed-frequency timing chain in a clock oscillator, preferably a stable clock oscillator and a clock oscillator of the quartz crystal type. ("Stable" means sufficiently regular and precise so that no visually detectable flaws will exist in the positional registration of such pixel placements as will ultimately be indirectly generated by use of the fixed-frequency timing chain.) Next, interleaved time bases of finer resolution than is the fixed-frequency timing 10 chain are produced, preferably in delay lines. A memory stores mathematically-calculated and encoded selection decisions as to a times of each instance of pixel placement during the scanning of the energy beam. From these encoded selection decisions within of the memory, and also from the interleaved time bases of finer resolution than is the fixed-frequency timing chain, a succession of variably-time-separated pulses suitable to time the placement of pixels upon the media by the scanning energy beam are produced in real time. The collective pulses constitute the variable-frequency pixel placement timing chain.

This second aspect of the present invention for digitally generating a variable-frequency pixel placement timing chain from a fixed-frequency timing chain is, of course, integratable with the first aspect of the invention in that the fixed-frequency timing chain may be, and preferably is, synchronized to the scanning energy beam.

In greater detail, the preferred method of the present invention—performed in a image generator that scans an energy beam across a markable media at a non-uniform velocity in order to mark the media—for generating a variable-frequency pixel placement timing chain from a fixed-frequency timing chain necessarily starts with the generation, typically in a stable an accurate clock oscillator, of a fixed-frequency timing chain. (In actuality, a base frequency of a fixed-frequency quartz crystal clock oscillator is normally halved. The one-half frequency timing chain so resulting is still "fixed-frequency", so it is merely a matter of semantics as to where, and from what precise circuit or circuits the "fixed-frequency" timing chain is generated.)

Next, a copy of the fixed-frequency timing chain, shifted 180° in phase, is made. Delay lines serve to replicate both the fixed-frequency timing chain, and also the copy of the fixed-frequency timing chain that is shifted 180° in phase, so as to produce multiple copies of each. Namely, the fixed-frequency, and the 180° -phase-shifted fixed-frequency, timing chains are replicated at each of a plurality (typically 13) of different phase delays.

Meanwhile, the pulses of the fixed frequency timing chain are counted in an address counter to produce an address. A memory stores in each of a multiplicity of addresses of certain predetermined, invariant, pixel clock data that defines the frequency of a clock pulse that will correctly locate an associated pixel during a line scan of the scanning energy beam. This predetermined pixel clock data is read from the memory at the address that is currently within the address counter. Responsively to this read pixel clock data, ones of the variably-phase-delayed fixed-frequency, and the variably-phase-delayed 180° -phase-shifted fixed frequency, timing chains are combined in a variable-frequency pulse generator to produce 0, 1 or 2 pixel clock pulses. Each produced pixel clock pulse is suitably timed so that it will, nonetheless that the energy beam is scanned at the non-constant velocity, serve to permit marking of the media at spatially regular intervals. The collective pixel clock pulses produced by the variable-frequency pulse generator constitute, in aggregate, the variable-frequency pixel placement timing chain.

A detail description of the preferred conversion circuit in accordance with the present invention is as follows: The circuit includes a 180° phase shifter that receives the fixed-frequency timing chain and produces therefrom a "copy" of the fixed-frequency timing chain that is shifted 180° in phase. (The received "fixedfrequency" timing chain may be, in actuality, a one-half frequency copy of a higher frequency timing chain that is derived from a microwave radio frequency crystal clock oscillator.) A first delay line receives the fixed frequency timing chain, and another, second, delay line receives the fixed-frequency timing chain that is shifted 180° in phase. Each of the two delay lines respectively produces multiple copies of each the fixed-frequency, and the 180° phase-shifted constant frequency, timing chains delayed by each of a number, typically 13, of different phase delays. The maximum phase delay is typically 2 nanoseconds, and the nominal phase delay is 1.5 nanoseconds.

Meanwhile, an address counter counts the pulses of the constant frequency timing chain to produce an address. A memory holds at each of a multiplicity of addresses, and reads from each the multiplicity of addresses when addressed by a current address received from the address counter, pixel clock data. This pixel clock data defines the frequency of a clock pulse that will correctly clock information to the marker means at an associated one of non-uniformly-temporally-separated instances during the non-constant-velocity scan of the beamscanning means. For example, an imaging beam that is swept at a sinusoidal velocity might require data to be gated to control the on/off state of the beam at frequencies varying from approximately 32.5 Mhz (at or near each edge of the image, where the scanning beam velocity is least) to 65 Mhz (at or near the center of the image, where the scanning beam velocity is greatest). The pixel clock data is mathematically derived, and is calculated and loaded into the memory much before the imaging operation transpires.

A variable-frequency pulse generator is responsive to the pixel clock data for combining appropriate ones of the variably-phase-delayed constant-frequency, and the variably-phase-delayed 180° -phase-shifted constant frequency, timing chains so as to produce at each non-uniformly-temporally-separated instance a clock pulse that is suitable to gate data to the marker means. A "suitable" clock pulse means one that will, nonetheless that the beam is scanned at the non-constant velocity, selectively mark the media at regular intervals. Accordingly, the collective clock pulses produced by the variable-frequency pulse generator at all the non-uniformly-temporally-separated instances constitute the variable-frequency timing chain.

These and other aspects and attributes of the present invention will become increasingly clear upon reference to the following drawings, and accompanying specification.

DESCRIPTION OF THE PREFERRED EMBODIMENT

Figure 1:
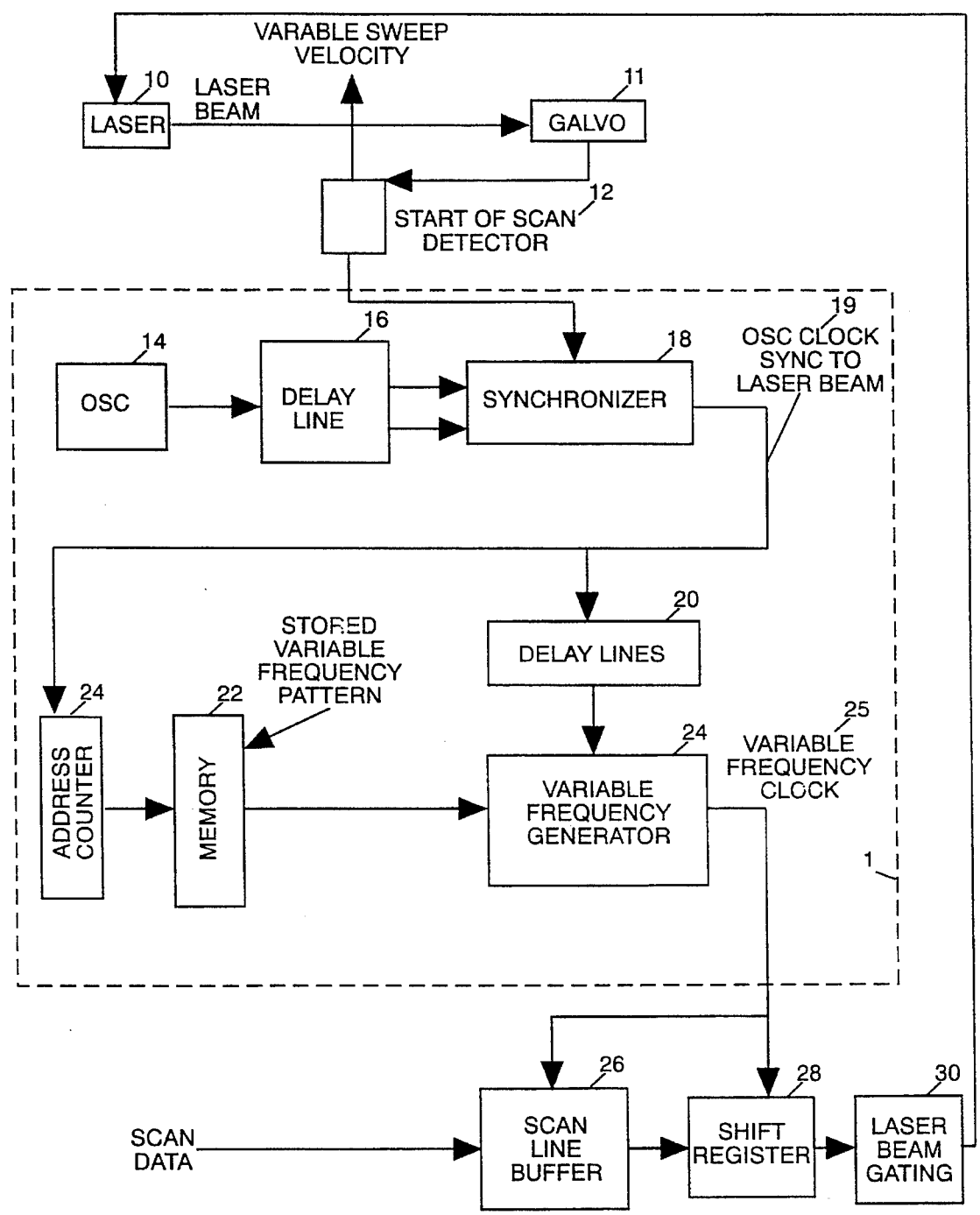
FIG. 1 is a top level schematic block diagram of both the timing chain synchronization, and the variable-frequency pixel placement timing chain generation, aspects and circuits of the present invention, which circuits are present within a scanning beam imager.

Both the timing chain synchronization, and the variable-frequency pixel placement timing chain generation, circuits 1 of the present invention are shown in the schematic block diagram of FIG. 1. Both circuits 1 are present, and used, within a scanning-beam imager.

A laser from a LASER 10 is deflected by a GALVO (galvanometer) 11 so as to sweep with a VARIABLE SWEEP VELOCITY. At a point in its scanning path, the LASER BEAM sweeps across a START OF SCAN DETECTOR 12. Detection of this occurrence permits a fixed-frequency clock signal derived from crystal oscillator OSC 14, and variably delayed in DELAY LINE 16, to be synchronized in SYNCHRONIZER 18.

This synchronized clock signal, or timing chain, is still of a constant, fixed, frequency. The OSCillator) CLOCK SYNC(hronized) TO (the) LASER BEAM 19 is variably delayed in DELAY LINES 20. The variably delayed clocks are selected by STORED VARIABLE FREQUENCY PATTERN data that was pre-stored in MEMORY 22, and which is now read from the MEMORY 22 at an address received from ADDRESS COUNTER 24, in VARIABLE FREQUENCY GENERATOR 24 in order to produce a (single) VARIABLE FREQUENCY CLOCK 25. SCAN DATA for a Raster Image Processor. (RIP) is shifted from a SCAN LINE BUFFER 26 at the appropriate time by SRIFT REGISTER 28 to gate the laser beam on and off in LASER BEAM GATING 30, thereby producing a desired image on an imaged (marked) media (not shown).

Figure 2A:
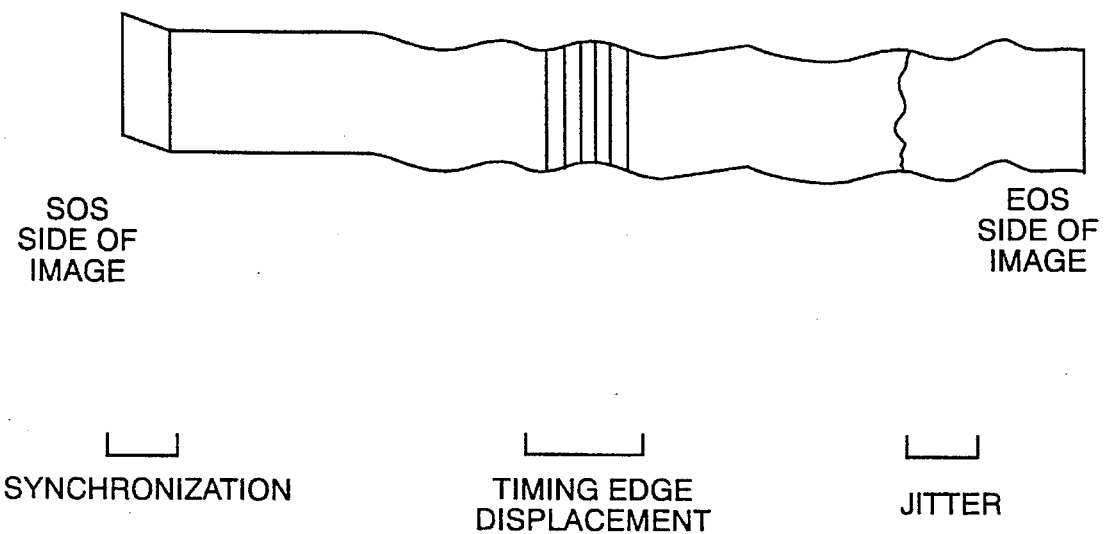
FIG. 2, consisting of FIGS. 2a and 2b, are diagrammatic representations of the accuracy, and repeatability, of pixel placement upon a single scan line, and upon successive scan lines, dependent upon whether a prior art voltage-controlled oscillator or, alternatively, the methods and circuits of the present invention, are used to generate the pixel placement timing chain by which the pixels are positioned upon the imaged media.

A diagrammatic representation of the accuracy, and repeatability, of an exemplary pixel placement (a single vertical line) upon a single scan line, and upon successive scan lines, by the use of a prior art voltage-controlled oscillator (VCO) is shown in FIG. 2a. The superior result obtained when the methods and circuits of the present invention are used to generate a pixel placement timing chain by which the exemplary pixels (a single vertical line) are positioned upon the imaged media is diagrammatically illustrated at an exaggerated scale FIG. 2b.

The length of the scan line is typically 45.7+ centimeters, or 18 inches. Typically some 32,400 pixels are placed, each in a precisely registered position, along each scan line (ergo, 1800 pixels per inch) by a laser beam that scans sinusoidally at a 1080 Hz rate. The scan lines are written in one, forward, direction only, and are consequently produced at a rate of 540 Hz. The image pixels need to be clocked onto the scanning energy (laser) beam at rates ranging from approximately 32.5 Mhz at or near each edge of the image, where the scanning beam velocity is lowest, to at least 65 Mhz at or near the center of the image, where the scanning beam velocity is greatest. The exact rate, and time, at which each pixel should be clocked is susceptible of mathematical calculation based on the sinusoidal sweep velocity of the scanning energy beam. In accordance with the present invention, a beam-synchronized variable-frequency pixel placement timing chain is produced that will permit the placement of the pixels on each scan line, and from scan line to scan line, at this high rate while incurring only visually imperceptible, sub-millimeter, error tolerances.

Figure 2B:
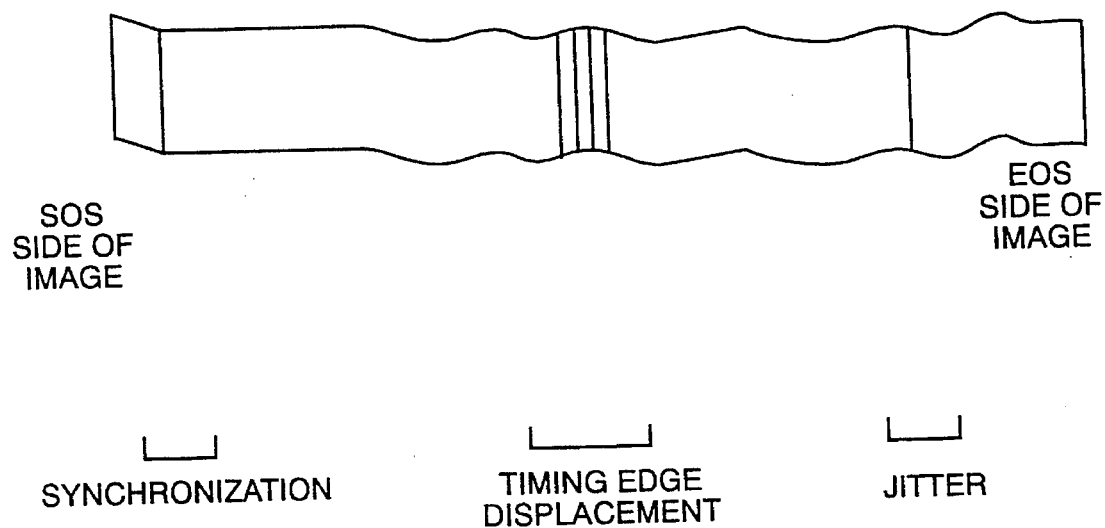

The image improvement depicted in FIGS. 2a and 2b is discussed in three areas: (i) synchronization, (ii) timing edge displacement, and (iii) jitter.

Previously, synchronization of a typically VCO-generated timing chain was typically achieved by using a photo diode detection of the scanning energy (laser light) beam to trip a comparator. This caused a one-shot to fire which, at the end of its pulse, started the VCO which provided the timing reference. The one-shot typically generated noise which would show up on the image as synchronization jitter.

The method of the present invention also uses a photo diode detection to trip a comparator. However, the resulting signal is fed directly into the circuits of the present invention, which are preferably implemented as an Application Specific Integrated Circuit (ASIC). Typically less than 1 nanosecond of jitter is experienced. Both the prior art, and the present, circuits generally performed adequately with respect to the synchronization task. (of course, the circuit of the present invention operates to produce a synchronized timing chain from a fixed frequency, constantly running, stable timing source—which is another entire problem.)

A more severe problem with previous circuits manifested itself in the produced images as "timing edge displacement". (A main VCO drift and correction error will be subsequently discussed under (iii) jitter.) The problem arose from slaving a variable frequency VCO to a fixed frequency VCO. The circuit resulted in the timing chain output being too fast, or too slow, and always hunting for the desired frequency. In attempting to image equal width narrow vertical lines the lines produced would be of a variable width. The problem also resulted in the production of poor quality gray scales.

The synchronization method, and circuit, of the present invention produces uniform lines that are much closer to the intended widths, with a maximum 4.3% error for a line of 3 pixels width. Quantitatively, for a pixel spot size of 25 microns nominal diameter, the pixel registration accuracy is ±0.1 millimeters (±0.003 inches) over a 42 centimeter (15 inch) image area. Errors of this magnitude are imperceptible to the naked eye.

A most severe problem with previous methods and circuits—jitter—resulted from starting a VCO at the beginning of a scan cycle and letting it run open loop throughout the entire cycle. The VCO would drift, and drift differently, during each cycle. In addition, a microprocessor would adjust the VCO frequency between cycles to try and better match it to the frequency of the beam-scanning mechanical stage, or self-resonant galvanometer ("galvo"). Some previous circuits evolved to the point where the fixed frequency was provided by a combination of two VCO's. A variable frequency was then generated from the fixed-frequency clock. This particular circuit resulted in a large amount of pixel error that grew progressively worse during the time of scan. The error manifested itself in the image as a wavy vertical line.

The synchronization method, and circuit, of the present invention has, effectively, only the initial synchronization uncertainty—less than 1 nanosecond—to deal with because the galvo is driven directly by a crystal clock via a timer—making that frequency drift is no longer appreciable, nor detectable, over the time of an entire page image. The lines at the end of each scan, or trace, effectively exhibit no greater timing error than the first line drawn. The synchronization method, and circuit, of the present invention also provides for the de-coupling of any interaction between the galvo amplitude control and any drive frequency corrections.

1. Synchronization of the Pixel Placement Timing Chain

Figure 3:
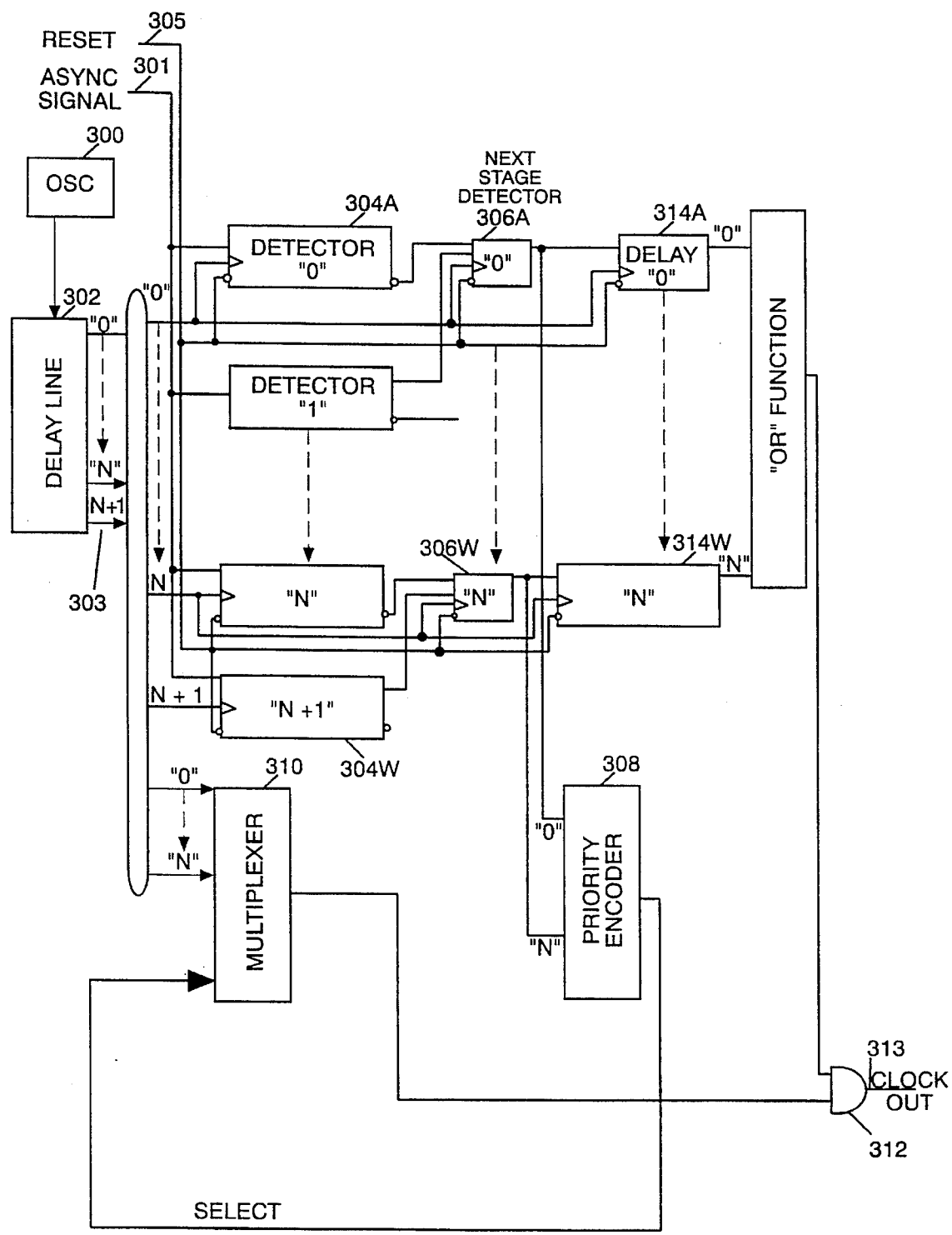
FIG. 3 is a schematic block diagram of the preferred embodiment circuit of a circuit in accordance with one aspect of the present invention for producing, in a beam-scanning imager from a continuous fixed-frequency clock that is of random phase relative to a scanning energy beam, a stable and accurate pixel placement timing chain that is synchronized to a scanning energy beam.

A schematic block diagram of the preferred embodiment of a crystal clock synchronization circuit in accordance with the present invention is shown in schematic diagram in FIG. 3. This circuit is, of course, but a beginning, first, aspect of the present invention which ultimately serves to produce, in a beam-scanning imager from a continuous fixed-frequency clock that is of a random phase relative to a scanning energy beam, a stable and accurate variable-frequency pixel placement timing chain.

The preferred clock is a free running crystal oscillator 300 has a nominal frequency of 80Mhz and a high degree of stability. To achieve synchronization to the asynchronous signal ("ASYNC SIGNAL") 301 the clock oscillator 300 is fed into a delay line 302. This produces a wave of phase shifted, tightly spaced rising edge pulses (less than 1ns apart) whose time span exceeds the period of the crystal oscillator 300. Each of these pulses "0" through "N+1" 303 is sent to its own associated detection circuit DETECTOR "0" 304a through DETECTOR "N+1" 304w.

The propagation delay of the asynchronous signal ASYNC SIGNAL 301 is controlled so that it arrives at each of the phase DETECTORs 304a through 304w at the same time. The phase DETECTORs 304a–304w are reset at the end of each cycle by signal RESET 305. The output clock being produced will therefore stop at the end of each cycle and start again in synchronization with the asynchronous occurrence of start-of-scan signal ASYNC SIGNAL 301 for each cycle.

Figure 5:
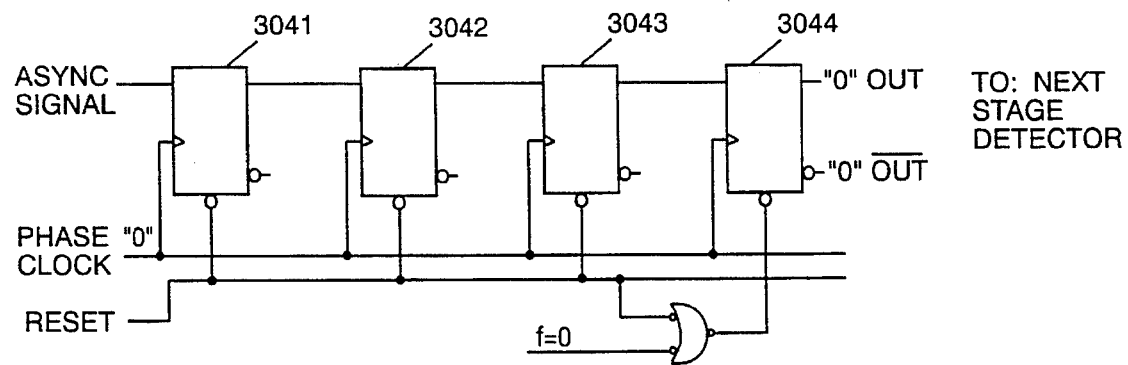
FIG. 5 is a detail schematic diagram of a detector circuit shown in the block diagram of FIG. 3.

As the phased clock signals 303 arrive at their respective DETECTORs 304a through 304w the asynchronous signal ASYNC SIGNAL 301 is detected. Metastable conditions that occur are removed by successive clocked stages within each DETECTOR 304a through 304w. Reference the detail schematic of a DETECTOR 304a through 304w in FIG. 5. Within each DETECTOR 304a through 304w four flip-flops 3041–3044 are connected in series.

Figure 6:
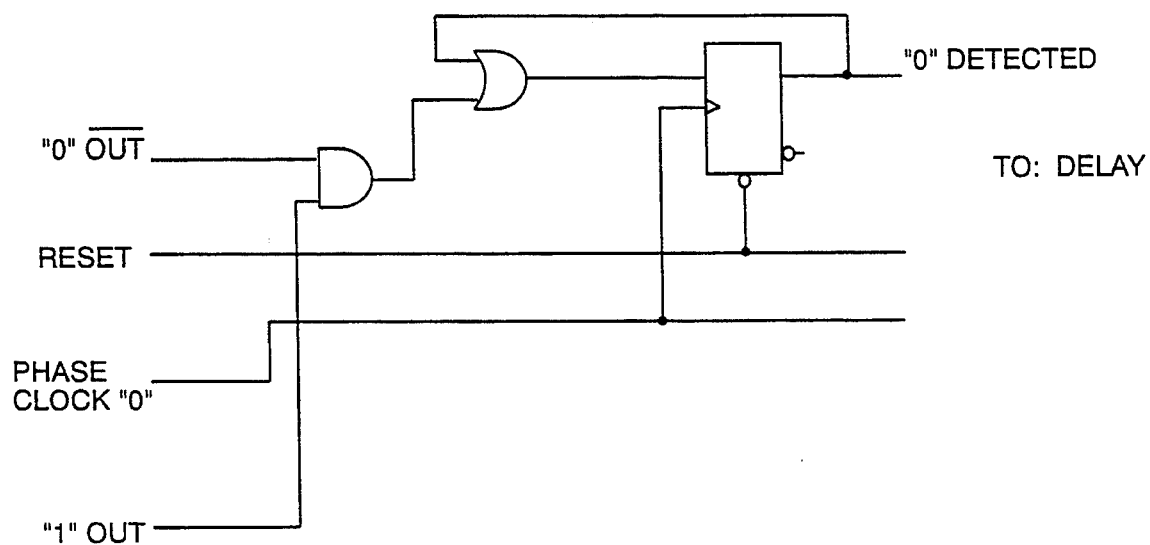
FIG. 6 is a detail schematic diagram of a next stage detector circuit shown in the block diagram of FIG. 3.

The removal of metastable conditions results in a family of stable, phased outputs which are compared in the NEXT STAGE DETECTORs 306a–306u. A detail schematic of a NEXT STAGE DETECTOR 306a–306u is shown in FIG. 6. By comparing the interim output of each stage to its successive stage the clock edge just prior to the asynchronous event can be determined. One of the phases which is not set will detect that the next successive stage is set. This condition is captured and propagated by the same phase clock which detected it. (In practice since the phased clocks exceed the period of the crystal oscillator 300 it is possible that two such events have occurred. A PRIORITY ENCODER 308 is used to select the pulse nearest the delay line input.)

Figure 7:
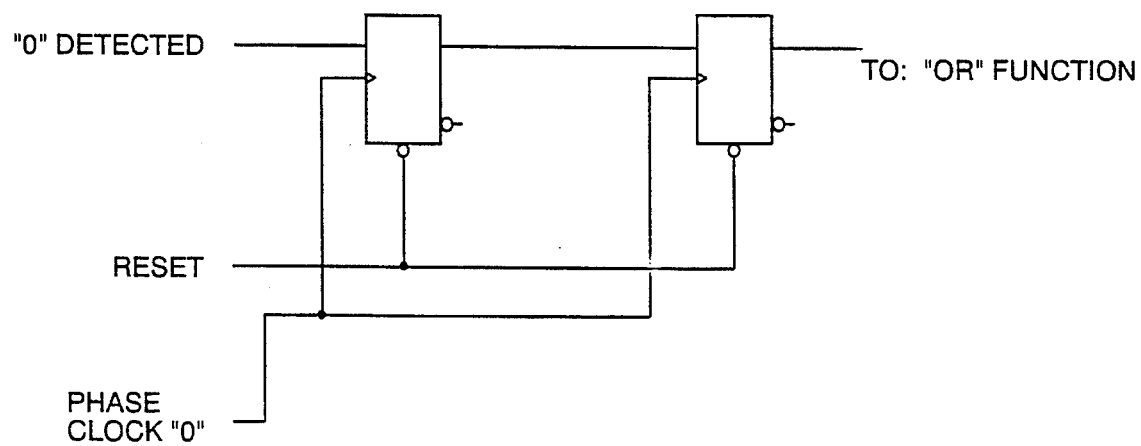
FIG. 7 is a detail schematic diagram of a delay circuit shown in the block diagram of FIG. 3.
Figure 8:
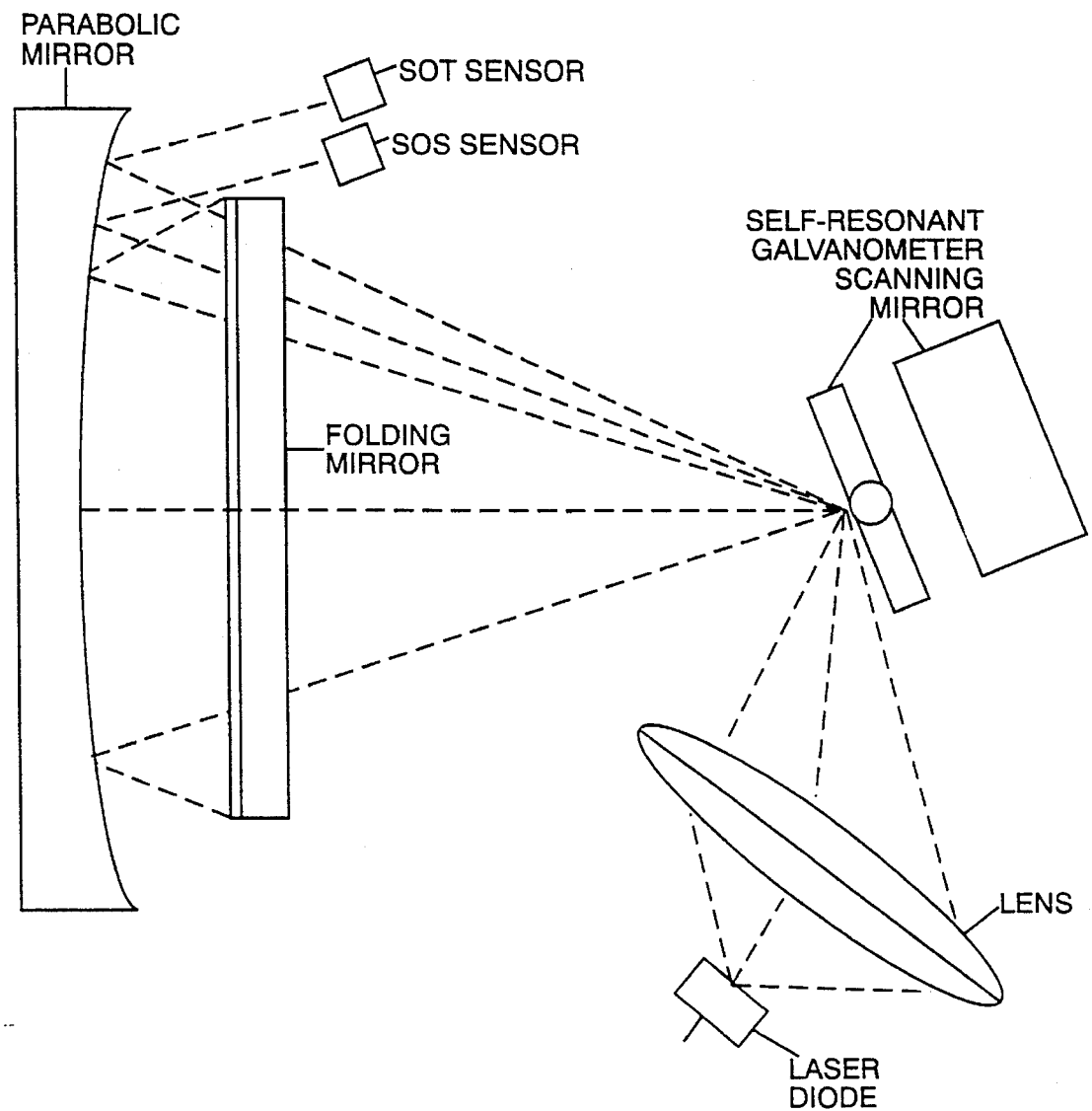
FIG. 8 is a diagrammatic representation, in orthogonal view, of an optical layout for a beam-scanning imager wherein a start-of-scan position of the scanning energy beam is detected.

Based on the output of PRIORITY ENCODER 308 a selected clock phase is multiplexed by MULTIPLEXER 310 to the output stage AND gate 312. To permit the PRIORITY ENCODER 308 and MULTIPLEXER 310 time to stabilize before gating out the mutiplexer-selected clock timing chain, the selected phase clock marks time by using itself to propagate the detection signal in circuits DELAY "0" 314a through DELAY "N" 314u. A detail schematic of a DELAY circuit 314a–314u is shown in FIG. 7. The propagated detection signal then synchronously enables the multiplexed clock, preventing runt pulses from occurring in the final output signal.

Figure 4:
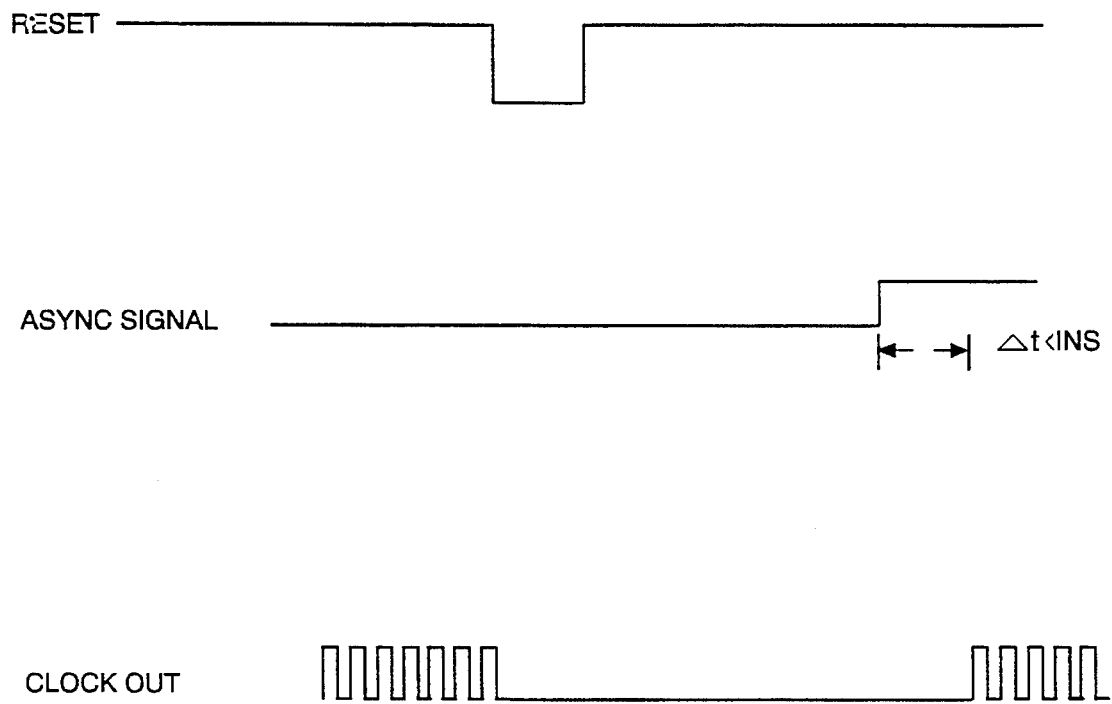
FIG. 4 is a timing diagram of certain major signals, including the synchronized pixel placement timing chain, that are shown in the schematic block diagram of FIG. 3.

A timing diagram of the major signals, including the synchronized pixel placement timing chain, that are used by, and produced in, the clock synchronization circuit of the present invention shown in FIG. 3 are themselves shown in the timing diagram of FIG. 4.

2. Digital Generation of a Variable-Frequency. Pixel Placement Timing Chain from a Fixed-Frequency Timing Chain The synchronized crystal CLOCK OUT signal 313 that was shown in FIG. 3 and immediately previously described is used as an input to generate a variable frequency clock for use in shifting the pixel data to the laser drive circuit. The general principle of circuit operation is described in the remainder of this paragraph. The period of the crystal clock is too coarse to be used directly for pixel edge placement. Finer resolution is obtained by feeding the clock into a pair of delay lines which are phase adjusted to be 180° out of phase with each other. This provides fine tap spacings on an interleaved time bases which are available for pixel edge placement. The selection decision of whether to generate a pixel, and if so which delay line tap to use, is encoded and placed in a slow speed PROM prior to use of the circuit. During initialization of the desired pixel density rate, the associated contents of the PROM are downloaded into a high speed RAM for use in real time during the imaging cycle.

Figure 9:
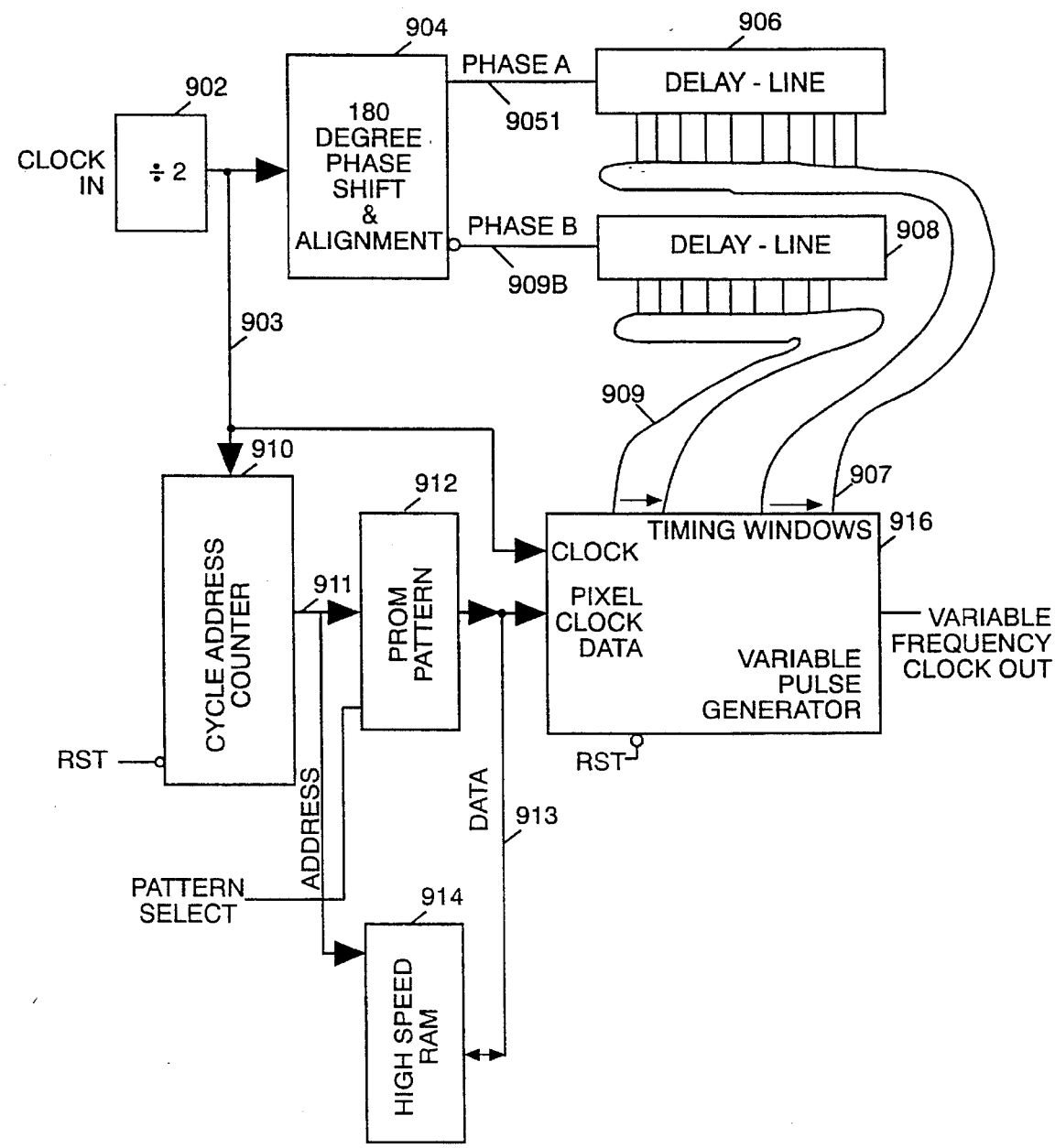
FIG. 9 is a schematic block diagram of the preferred embodiment circuit of a circuit in accordance with another aspect of the present invention for digitally producing, in a beam-scanning imager from a continuous fixed-frequency clock, a variable-frequency pixel placement timing chain.
Figure 10:
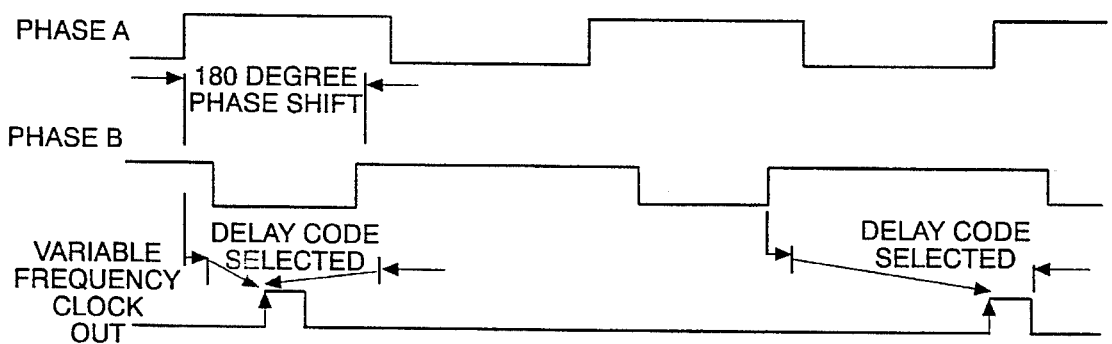
FIG. 10 is a timing diagram of certain major signals, including the variable-frequency pixel placement timing chain, that are shown in the schematic block diagram of FIG. 9.

In greater detail, the preferred conversion circuit in accordance with the present invention is shown in FIG. 9. this circuit takes the synchronized crystal CLOCK OUT signal 313 that was shown in FIG. 3 as signal CLK IN 313 and halves its frequency in ÷2 circuit 902. The divided-, but fixed-, frequency timing chain is transmitted to a 180° PHASE SHIFTER AND ALIGNMENT circuit 904 that produces therefrom a "copy" of the fixed-frequency timing chain that is shifted 180° in phase. (The received "fixed-frequency" timing chain may be, in actuality, a one-half frequency copy of a higher frequency timing chain that is derived from a microwave radio frequency crystal clock oscillator.) A first DELAY LINE 906 receives the fixed frequency timing chain (PHASE A 9051), and another, second, DELAY LINE 908 receives the fixed-frequency timing chain that is shifted 180° in phase (PHASE B 9053). Each of the two DELAY LINEs 906,908 respectively produces multiple copies 907, 909 of each the fixed-frequency, and the 180° -phase-shifted constant frequency, timing chains delayed by each of a number, typically 13, of different phase delays. The maximum phase delay is typically 2 nanoseconds, and the nominal phase delay is 1.5 nanoseconds.

Figure 11:
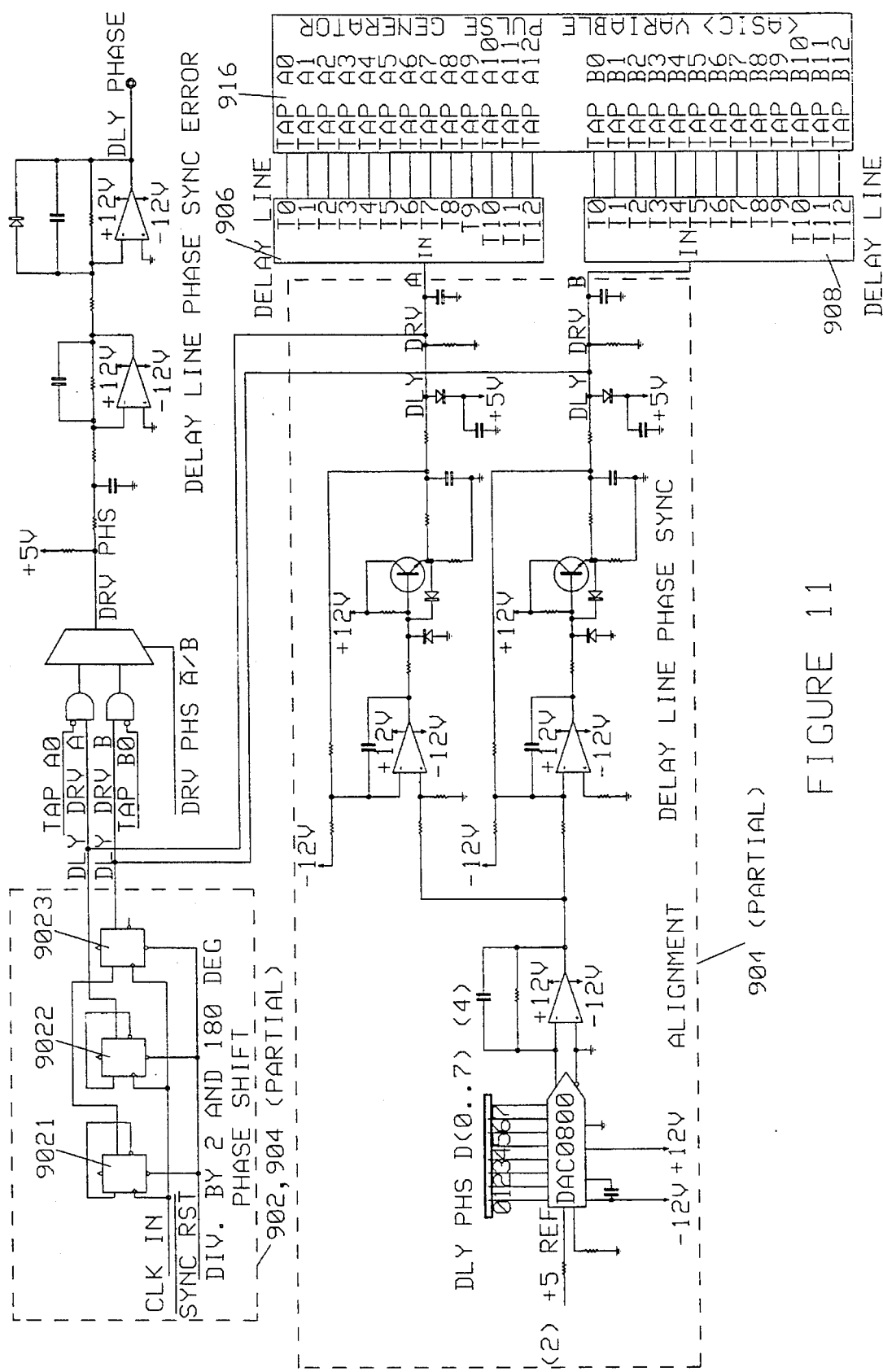
FIG. 11 is a detail schematic diagram of the 180° phase shift and alignment circuit shown in the block diagram of FIG. 9.

An expanded, detail, schematic of the combined ÷2 circuit 902, the 180° PHASE SHIFTER AND ALIGNMENT circuit 904, and the DELAY LINEs 906, 908 (and, also, in block form the VARIABLE PULSE GENERATOR 916 that these circuits feed) is shown in FIG. 11. In the lower left corner of the diagram timing to drive DLY DRV A and DLY DRY B is produced by flip-flops 9021–9023, preferably within an Application Specific Integrated Circuit (ASIC). The two phases are carefully controlled to be exactly 180° degrees out of phase with respect to each other.

Delay lines have very poor tolerances on their propagation delay between their input and their first output tap. This error could result in an unacceptably large error in pixel placement accuracy. To virtually eliminate this error, the circuit of the present invention shown in FIG. 11 monitors the first output tap of each DELAY LINE 906, 908. A pulse is produced that is proportional to the "input to first tap out" delay of each delay line. This pulse is multiplexed to a microprocessor. Because the signals form both DELAY LINEs 906, 908 are processed by the same analog circuit, monitoring errors cancel.

The microprocessor receiving the pulse decides which delay line is faster and applies a correction signal to a D/A converter. The upper portion of FIG. 11 shows this circuit. A pair of integrators are controlled by the microprocessor so as to alter the rise time of the signals DLY DRV A and/or DLY DRV B as applied to the inputs of DELAY LINEs 906, 908. One signal rise time normally gets faster as the other gets slower. The drive of the DLY DRV A and DLY DRV B signals must be, and is, open collector to permit this scheme to work. To protect the rise-time-corrected signal output, and the inputs to DELAY LINEs 906, 908, the rising signal is truncated by a diode to not exceed +5 v.d.c.

Meanwhile, a CYCLE ADDRESS COUNTER 910 counts the half-frequency pulses 903 of the fixed-frequency timing chain CLK IN 313 to produce an ADDRESS 911. A PROM PATTERN memory 912 holds at each of a multiplicity of addresses, and reads from each the multiplicity of addresses when addressed by a current ADDRESS 911 received from the CYCLE ADDRESS COUNTER 910, pixel clock DATA 913. This pixel clock DATA 913 defines the frequency of a clock pulse that will correctly clock information to the marker means at an associated one of non-uniformly-temporally-separated instances during the non-constant-velocity scan of the beam scanning means. For example, an imaging beam that is swept at a sinusoidal velocity might require data to be gated to control the on/off state of the beam at frequencies varying from approximately 32.5 Mhz (at or near each edge of the image, where the scanning beam velocity is least) to 65 Mhz (at or near the center of the image, where the scanning beam velocity is greatest). The pixel clock DATA 913 is mathematically derived, and is calculated and loaded into the PROM PATTERN MEMORY 912 much before the imaging operation transpires.

A VARIABLE PULSE GENERATOR 916 is responsive to the pixel clock DATA 913 for combining appropriate ones of the variably-phase-delayed fixed-frequency timing chains 907, and the variably-phase-delayed 180° -phase-shifted fixed-frequency timing chains 909, so as to produce at each non-uniformly-temporally-separated instance a clock pulse that is suitable to gate data to the marker, or laser beam. A "suitable" clock pulse means one that will, nonetheless that the beam is scanned at the non-constant velocity, selectively mark the media at regular intervals. Accordingly, the collective clock pulses produced by the variable-frequency pulse generator at all the non-uniformly-temporally-separated instances constitute the variable-frequency timing chain.

Figure 12:
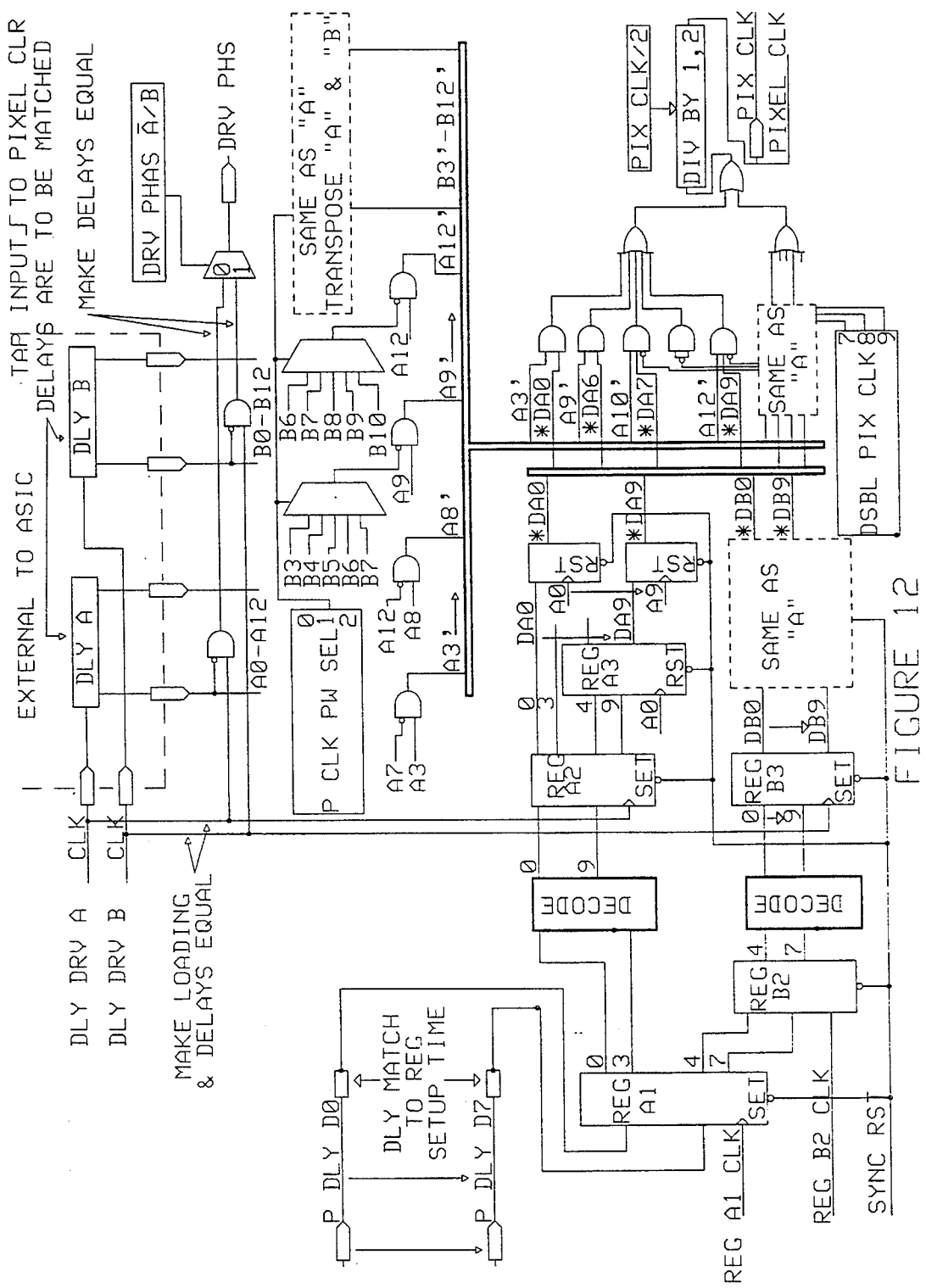
FIG. 12 is a detail schematic diagram of the variable pulse generator circuit shown in the block diagram of FIG. 9.
Figure 13:
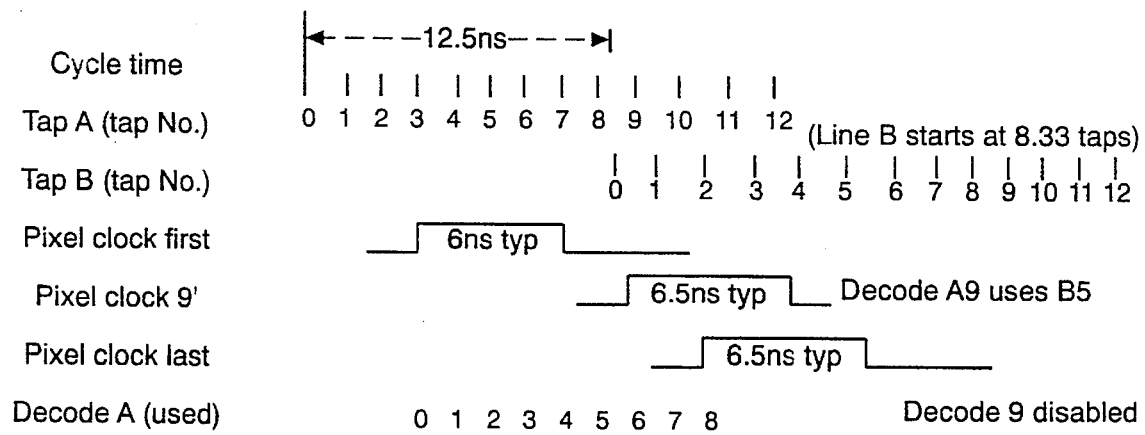
FIG. 13 is a diagrammatic illustration of the mode and manner of pulse generation within the variable pulse generator circuit shown in FIG. 12, and also in the block diagram of FIG. 9.

An expanded, detail, schematic of the VARIABLE PULSE GENERATOR 916 is shown in FIG. 12. The circuit shown combines the delay line tap signals and encoded data resident within PROM PATTERN memory 912 (shown in FIG. 9) to produce the variable-frequency clock signal. The delay line signals enter near the right-hand top portion of the schematic. A series of pulses are generated. For example, taps A3 and A7 are used to produce a pulse A3' which is started by the signal from tap A3 and terminated by the signal from tap A7. Similar pulses are generated until tap A9 is reached. Here the A9' pulse is terminated by a multiplexed signal which can be any one of the signal form taps B3 through B7. This complexity in the termination of the final signal was added so that different crystal oscillator frequencies and delay line tap spacings may be alternatively used with the circuit shown in FIG. 12. In the same manner a series of "B" pulses are generated.

For an 80 MHz crystal oscillator and delay lines with 1.5 ns taps, Decode 9 is disabled by the microprocessor using the DSBL PIX CLK 9 signal in the lower right portion of the FIG. 11 diagram. The pulse terminating multiplexer is set using the P CLK PW SEL 0-2 signals set to a binary value of 2. This provides that pulse A9' which was initiated by tap A9 is terminated by tap B5.

FIG. 12 shows the oscillator cycle time and examples of the first and last pulses that would be generated by delay line A. The bytes of memory (4 binary bits) which are decoded to select the desired pulse are shown on the Decode A (used) line of the diagram. The "Pix clk first" pulse was generated by using decode value "0". Subsequent pulses in sequential order are selected by decodes 1,2,3,4,5,6,7 and 8. The "Pix clk 9'" pulse selected by binary decode 6 is the first pulse to be terminated by delay line B. The last pulse from delay line and which is used is selected by binary decode 8. Decodes above 8 (9,A,B,C,D,E, and F) will produce no signal at the output PIX CLK output (they are not used).

The pulse widths which are produced are a function of which delay line terminates the pulse. Pulses terminated by the delay line which initiated the pulse are typically 6 ns while pulses terminated by the other delay line are typically 6.5 ns long.

Pulses generated by delay line B are generated and their decode selection is used in exactly the same way as those of delay line A.

The data entering from the HIGH SPEED RAM 914 (shown also in FIG. 11) arrives every 20 ns when using a 100 Mhz oscillator. This does not allow much time to capture, decode and multiplex out the desired pulse, which may run up to twice the rate. Therefore the extensive pipelining is used to time shift the tasks being performed. First the data is captured in Register A1. It is then broken into two nibbles. The lower nibble will control pulses originating from delay line A. The upper nibble controls the delay line B pulses. Since the B delay line is 180° out of phase with delay line A the data is captured by a second register B2 for use later in the cycle.

During cycle "A" the lower nibble is decoded. If the value is "F" no pulse will be produced. If the value is less than "9" a pulse will be produced. (At the output stage pulses 7, 8 and 9 may be disabled by the processor to accommodate different crystal oscillator frequencies.) Moving to the right in the circuit, decodes 0–3 are handled directly while decodes 4–9 are latched by A0. This is done to ensure the decodes are still present when required. All of the decodes are now latched by their associated delay line tap (DAO is latched by A0 to produce time stable decode *DAO.) It may be noted that decode *DAO is used to gate pulse A3' which was generated earlier.

During cycle "B" the "B" generation is done the same way as the "A" generation except that it is displaced in time and uses the The "A" and "B" generated pulses are "ORed" together. At this point, and at all other pulse propagating points in the circuit, the delays are carefully controlled and matched to prevent additional timing error from entering into the signal.

The requirements for the HIGH SPEED RAM Memory 914 (shown in FIG. 9) are as follows. In an exemplary application of the present invention the galvo runs at 450 Hz, the crystal clock frequency is 80mhz, and the imaging time covers ⅓ of the cycle (there is one nibble per oscillator cycle). Multiplication of (1/540)×(1/3)×(1/2)×80mhz dictates that 24691 words of memory are required. The next larger even binary number to this number is 32768 (32K). In addition the pattern is distinguished between even and odd scan lines to improve image quality, and there are two resolution densities present, (1800 DPI and 1200 DPI). Therefore 32K per pattern times 4 patterns gives a 128K PROM requirement. Since both the even and odd scan lines must be present in the high speed RAM at the same time, the PROM PATTERN memory 912 is 64K in size.

In accordance with the preceding explanation, the present invention should be interpreted broadly, and in accordance with the following claims only, and not solely in accordance with that particular embodiment within which the invention has been taught.

What is claimed is:

1. A method, performed in a image generator that scans an energy beam across a markable media at a non-uniform velocity in order to mark the media, for generating a variable-frequency pixel placement timing chain from a fixed-timing chain, the method comprising the steps of:

producing in a 180° phase shifter from the fixed-frequency timing chain a copy of the fixed-frequency timing chain that is shifted 180° in phase;

replicating in delay lines the fixed-frequency timing chain, and also the copy of the fixed-frequency timing chain that is shifted 180° in phase, to produce multiple copies of the fixed-frequency timing chain, and also of the 180°-phase-shifted fixed-frequency timing chain at each of a plurality of phase delays;

storing in a memory encoded selection decisions as to a time of each instance of pixel placement during the scanning of the energy beam; and producing in a variable frequency generator, in real time during the scanning of the energy beams from the encoded contents of the memory, from the multiple copies of the fixed-frequency timing chain, and from the multiple copies of the 180°-phase-shifted fixed-frequency timing chain a succession of variably-time-separated pulses suitable to time the placement of pixels upon the media by the scanning energy beam, the succession of pulses constituting a variable-frequency pixel placement timing chain.

2. The method according to claim 1 that, before the producing, further comprises:

synchronizing the generated fixed-frequency timing chain to the scanning energy beam.

3. The method according to claim 1 that, before the producing, further comprises:

generating the fixed-frequency timing chain from the oscillations of a clock oscillator that is sufficiently stable so that no visually detectable flaws will exist in positional registration of any such pixel placements as are ultimately indirectly generated by use of the fixed-frequency timing chain.

4. A method, performed in a image generator that scans an energy beam across a markable media at a non-uniform velocity in order to mark the media, for generating a variable-frequency pixel placement timing chain from a fixed-frequency timing chain, the method comprising the steps of:

producing in a 180° phase shifter a copy of the fixed-frequency timing chain that is shifted 180° in phase;

replicating in delay lines the fixed-frequency timing chain, and also the copy of the fixed-frequency timing chain that is shifted 180° in phase, to produce multiple copies of the fixed-frequency timing chain, and also of the 180°-phase shifted fixed-frequency timing chain at each of a plurality of phase delays;

counting in an address counter pulses of the fixed frequency timing chain to produce therefrom an address;

storing in each of a multiplicity of addresses of a memory certain predetermined pixel clock data that defines a frequency of a clock pulse that will correctly locate an associated pixel upon a scan line during a line scan of the scanning energy beam;

reading from the memory the predetermined pixel clock data at an address that is currently within the address counter; and combining, in a variable-frequency pulse generator responsive to the read pixel clock data, ones of the multiple copies of the variably-phase-delayed fixed-frequency timing chain, and also ones of the multiple copies of the variably-phase-delayed 180°-phase-shifted fixed frequency timing chain to produce pixel clock pulses suitably timed so that, nonetheless that the energy beam is scanned at the non-constant velocity, the media is marked at spatially regular intervals;

wherein the pixel clock pulses produced by the variable-frequency pulse generator constitute the variable-frequency pixel placement timing chain.

5. A variable-frequency pixel placement timing chain generation circuit for an image generator that scans an energy beam across a markable media at a non-uniform velocity and that requires such a timing chain in order to control the scanning energy beam to mark the media, the circuit comprising:

a clock oscillator means for generating a fixed-frequency timing chain having pulses;

a phase shifter means for producing a 180° phase-shifted copy of the fixed-frequency timing chain;

a delay line means for replicating the fixed-frequency timing chain, and also the 180° phase-shifted copy of the fixed-frequency timing chain that is shifted 180° in phase, at each of a plurality of different phase delays;

an address counter means for counting the pulses of the fixed frequency timing chain to produce an address;

a memory means for storing in each of a multiplicity of addresses certain predetermined pixel clock data that defines the frequency of a clock pulse that will correctly locate an associated pixel upon a scan line during a line scan of the scanning energy beam, and for reading the predetermined pixel clock data at an address that is currently within the address counter; and a variable-frequency pulse generator means for combining, responsive to the read pixel clock data, ones of the replicated variably-phase-delayed fixed-frequency timing chain, and also ones of the replicated variably-phase-delayed 180°-phase-shifted fixed frequency timing chain to produce pixel clock pulses suitably timed so as to, nonetheless that the energy beam is scanned at a non-constant velocity, the media is marked at spatially regular intervals;

wherein the pixel clock pulses produced by the variable-frequency pulse generator means constitute the variable-frequency pixel placement timing chain.

6. In an imaging apparatus having a beam scanning means for scanning an energy beam across a markable media at a scan velocity that is not constant;

a marker means responsive to clocked information for turning the scanning energy beam on and off during the course of the scanning in order that the scanning energy beam might selectively mark the media; and a variable-frequency clock means producing a variable-frequency timing chain suitable to clock information to the marker means as the clocked information at non-uniformly-temporally-separated instances during the non-constant-velocity scan of the beam scanning means so that the marker means will, nonetheless that the beam is scanned at the non-constant velocity, selectively mark the media at regular intervals; an improvement to the variable-frequency clock means comprising:

a fixed-frequency clock oscillator means for producing a fixed-frequency timing chain having pulses;

a 180° phase shifter means, receiving the fixed-frequency timing chain, for producing a copy of the fixed-frequency timing chain that is shifted 180° in phase;

a delay line means, receiving the fixed frequency timing chain and also the fixed-frequency timing chain that is shifted 180° in phase, for producing multiple copies of each of the fixed-frequency timing chain, and also the 180° -phase-shifted fixed frequency timing chain at each of a plurality of phase delays;

an address counter for counting pulses of the fixed frequency timing chain to produce therefrom an address;

a memory for holding a each of a multiplicity of addresses, and for reading from each the multiplicity of addresses when so addressed by an address from the address counter, pixel clock data that defines the frequency of a clock pulse that will correctly clock information to the marker means at an associated one of non-uniformly-temporally-separated instances during the non-constant-velocity scan of the beam scanning means; and a variable-frequency pulse generator responsive to the pixel clock data for combining appropriate ones of the multiple copies of the variably-phase-delayed fixed-frequency timing chain, and also ones of the multiple copies of the variably-phase-delayed 180° -phase-shifted fixed frequency timing chain, so as to produce at non-uniformly-temporally-separated instances clock pulses suitable to gate data to the marker means so that the marker means will, nonetheless that the beam is scanned at the non-constant velocity, selectively mark the media at regular intervals;

wherein the clock pulses produced by the variable-frequency pulse generator at all the non-uniformly-temporally-separated instances constitute the variable-frequency timing chain.

7. The improvement to an imaging apparatus in accordance with claim 6 wherein the fixed-frequency clock oscillator means comprises:

a crystal oscillator providing producing the fixed-frequency timing chain.

8. A method, performed in a image generator that scans an energy beam across a markable media at a non-uniform velocity in order to mark the media, for generating a variable-frequency pixel placement timing chain synchronized to the scanning energy beam, the method comprising the steps of:

generating in a clock oscillator a fixed-frequency timing chain;

replicating in a delay line the fixed-frequency timing chain to produce a plurality of variably-phase-delayed fixed-frequency timing chains;

detecting in a sensor, and at a time asynchronous to the fixed-frequency timing chain, a set position of the scanning energy beam;

comparing in a comparison circuit a asynchronous detection of a set position of the scanning energy beam to each of the plurality of variably-phase-delayed fixed-frequency timing chains in order to identify a one such variably-phase-delayed fixed-frequency timing chain that is in a predetermined, fixed, time relationship to the detection as a synchronized fixed-frequency timing chain;

producing from the synchronized fixed-frequency timing chain multiple copies of the fixed-frequency timing chain, and also multiple copies of the fixed-frequency timing chain shifted 180° in phase, at each of a plurality of phase delays;

storing in a memory encoded selection decisions as to a time of each instance of pixel placement during the scanning of the energy beam; and producing in real time during the scanning of the energy beam from the encoded contents of the memory, from the multiple copies of each of the fixed-frequency timing chain, and from the multiple copies of the fixed-frequency timing chain shifted 180° in phase, a succession of variably-time-separated pulses suitable to time placement of pixels upon the media by the scanning energy beam, the pulses constituting a synchronized variable-frequency pixel placement timing chain.

9. A variable-frequency pixel placement timing chain generation circuit for an image generator that scans an energy beam across a markable media at a non-uniform velocity and that requires a variable-frequency pixel placement timing chain in order to control the scanning energy beam to mark the media, the circuit comprising:

a clock oscillator generating a fixed-frequency timing chain;

a phase shifter producing a 180° phase-shifted copy of the fixed-frequency timing chain;

delay lines replicating the fixed-frequency timing chain, and also the 180° phase-shifted copy of the fixed-frequency timing chain, to produce at each of a plurality of different phase delays a replicated fixed-frequency timing chain, and also a replicated 180° phase-shifted fixed-frequency timing chain;

an address counter counting pulses of the fixed frequency timing chain to produce an address;

a memory storing in each of a multiplicity of addresses certain predetermined pixel clock data that defines the frequency of a clock pulse that will correctly locate an associated pixel upon a scan line during a line scan of the scanning energy beam, and reading the predetermined pixel clock data at an address that is currently within the address counter; and a variable-frequency pulse generator combining, responsive to the read pixel clock data, the replicated variably-phase-delayed fixed-frequency timing chain, and also the replicated variably-phase-delayed 180° -phase-shifted fixed-frequency timing chain, to produce the variable-frequency pixel placement timing chain, which variable-frequency pixel placement timing chain is suitable so as to, nonetheless that the energy beam is scanned at the non-constant velocity, permit a marking of the media at spatially regular intervals.

* * * * *